Figures 1, 2:
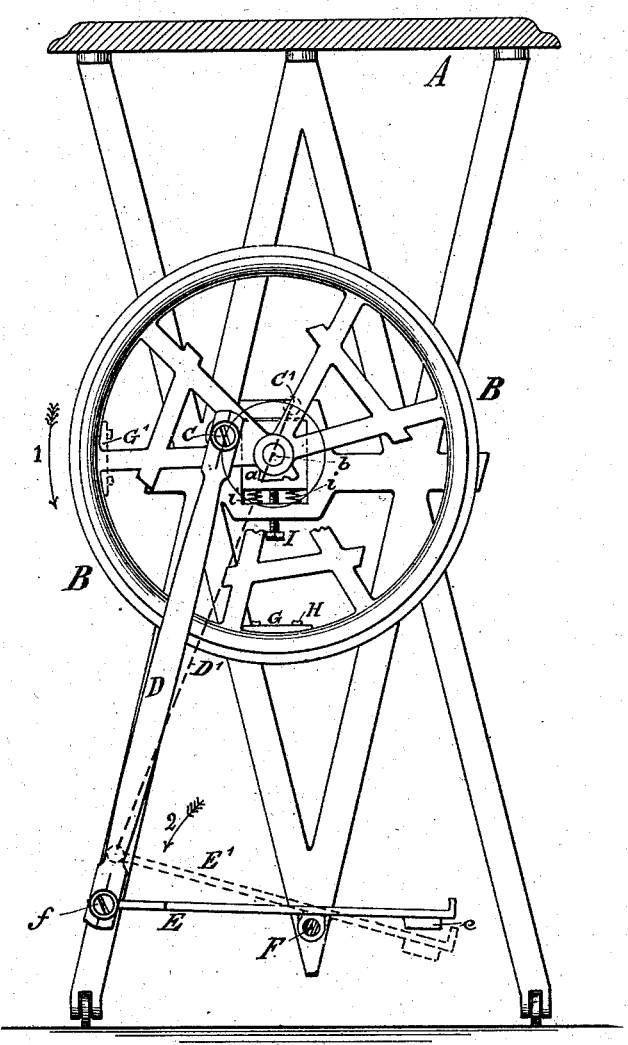

(No Model.)

J. H. WHITNEY.
DEVICE FOR POISING TREADLE AND CRANK MOVEMENTS.

No. 292,969. Patented Feb. 5, 1884.

WITNESSES:

INVENTOR

James H. Whitney
BY A. W. Almquist
ATTORNEY

UNITED STATES PATENT OFFICE.

JAMES H. WHITNEY, OF BROOKLYN, NEW YORK.

DEVICE FOR POISING TREADLE-AND-CRANK MOVEMENTS.

SPECIFICATION forming part of Letters Patent No. 292,969, dated February 5, 1884.

Application filed July 6, 1883. (No model.)

*To all whom it may concern:*

Be it known that I, JAMES H. WHITNEY, a citizen of the United States, and a resident of Brooklyn, in the county of Kings and State of New York, have invented a new and useful Improvement in Sewing-Machines, of which the following is a specification.

The object of my invention is to provide a simple and efficient mode of poising the treadle-and-crank movement for running sewing-machines in such a manner that the balance-wheel, when operation has ceased, shall always stop normally in such a position that the crank has passed the dead-point. The tendency of the crank to stop on the dead-point is in a measure relieved or decreased by giving the fly-wheel an elastic bearing, as described and claimed in my patent numbered 275,966, dated April 17, 1883, inasmuch as the unevenness in movement of the operator's feet upon the treadle, and consequent more or less concussions or unevenness in the movement is taken up in the yielding of the said bearing; but the said elastic bearing will not prevent the stopping of the crank on the dead-center when operation ceases.

My invention consists in the mode and means for balancing the treadle, pitman, crank, and fly-wheel for regulating the movement of the elastic bearing.

In the accompanying drawings, Figure 1 represents a sectional elevation of a sewing-machine stand, showing the entire crank-motion as poised according to my present invention. Fig. 2 is a top view of an adjustable weight applicable to the fly-wheel.

A is the frame of the stand, and $a$ the elastic bearing in the same, to which the fly-wheel is pivoted. B is the fly-wheel, and $b$ its center. C is the crank-pin, D the pitman, E the treadle, and F the treadle-shaft.

In order to prevent any limping or unevenness in the motion by the weight of the pitman, crank, and treadle, I cast or attach upon the under side of the forward end of the treadle E a weight, $e$, the size of which is carefully ascertained and adjusted, so as to counterbalance the weight of the crank-hub, crank-pin, pitman, and the gain in their weight due to the greater leverage or the greater distance between the treadle-shaft F and the lower pivot, $f$, of the pitman as compared to the shorter leverage of the part of the treadle forward of the shaft F. When this is properly done, the crank-pin (although, of course, its natural tendency is to stop on the dead-center) will not have such a tendency, as heretofore, to stick on the said center—that is, to require much force to move it over the center; but it will, when left to itself, stop about the dead-center, either upper or lower, as the case may be, and require an exceedingly slight force to move it from the said point. In order, now, to insure that the fly-wheel B will always finally come to rest in such a position that the crank has progressed opposite the dead-point, giving sufficient leverage to turn it with the first pressure on the treadle, I secure, preferably, to the inner side of the rim of the wheel B a weight, G, which is thin and crescent-shaped, to conform with the shape of the rim, and in order to be able to adjust the position of the weight to a great nicety, I provide it with slots $g$, by means of which and headed screws H, passing through the said slots and threaded into the rim of the wheel B, it may be slid backward or forward a little to ascertain the best poised position, and then secured in said position by the said screws.

A glance at Fig. 1 of the drawings will make the construction and operation clear. The dotted position E' D' C' of the treadle, pitman, and crank-pin indicates that in which they will naturally be brought by the effect of the balance-weight $e$, this position being on the dead-point and rearward of the position in which they ought to be stopped; but if, now, the weight G be placed in the dotted position G', which is at a similar angular distance rearwardly in the movement of the vertical line from the center in which line the weight then naturally will finally stop, it is evident that the said weight, in moving from the position G' to assume its normal position, will turn the wheel B in the direction of arrow 1, and thus move the crank-pin from the position C' to C, in which it will be in readiness to enable the operator to start the machine with the first pressure on the treadle in the direction of arrow 2. If the wheel should stop when the crank is in its lower position on the upward movement, the motion should, of course, be started by pressure on the forward end of the treadle. By placing the weight $e$ underneath the forward end of the treadle it is entirely out of sight, and thus does not mar in the least the neatness of appearance.

Instead of poising the wheel by the detachable weight G, the same effect may be produced (when the exact location of the center of gravity of the weight is determined) by simply coring the mold for the casting in the rim of the wheel diagonally opposite to the weight, thus making the rim hollow and consequently lighter when the core has been removed from the casting.

In order to limit the downward movement of the elastic bearing $a$, while yet allowing the supporting-springs $i$ to be made light, and consequently sensitive, I enter through the frame, directly underneath the bearing $a$, centrally between the said springs $i$, a set-screw, I, against the upper end of which screw the bearing $a$ will be stopped when having moved downward to its determined limit.

Having thus described my invention, I claim as new and desire to secure by Letters Patent—

1. The mode herein shown and described of balancing the crank-motion for sewing-machines, which consists in equipoising the weights acting on opposite sides of the treadle-fulcrum by weighting the forward end of the treadle, and then applying to the fly-wheel a preponderating weight, G, for the purpose set forth.

2. In a crank-movement for sewing-machines, a treadle, E, provided beneath its forward end with a weight, $e$, in combination with the pitman D and with a fly-wheel, B, having a counter-weight, G, substantially as and for the purpose set forth.

3. The combination of the treadle E, provided at its forward end with a weight, $e$, the pitman D, and the fly-wheel B, having a counter-weight, G, said weight being adjustable in position.

4. In combination with the fly-wheel of a sewing-machine, the weight G, provided with slots $g$, and the screws H, passing through the said slots into the rim of said wheel, for securing and adjusting the position of the said weight, for the purpose set forth.

5. In combination with the frame A of a sewing-machine stand, and with the fly-wheel bearing $a$, having elastic support $i$, an adjustable stop, I, limiting the downward movement of the said bearing.

In testimony that I claim the foregoing as my invention I have signed my name, in presence of two witnesses, this 30th day of April, 1883.

JAS. H. WHITNEY.

Witnesses:
A. W. ALMQVIST,
A. WAHLBERG.